April 18, 1961  S. T. CARTER  2,980,278
BOTTLE SPOTTING APPARATUS FOR LABELING MACHINES
Filed July 27, 1959  7 Sheets-Sheet 1

INVENTOR.
Sidney T. Carter
BY
ATT'YS.

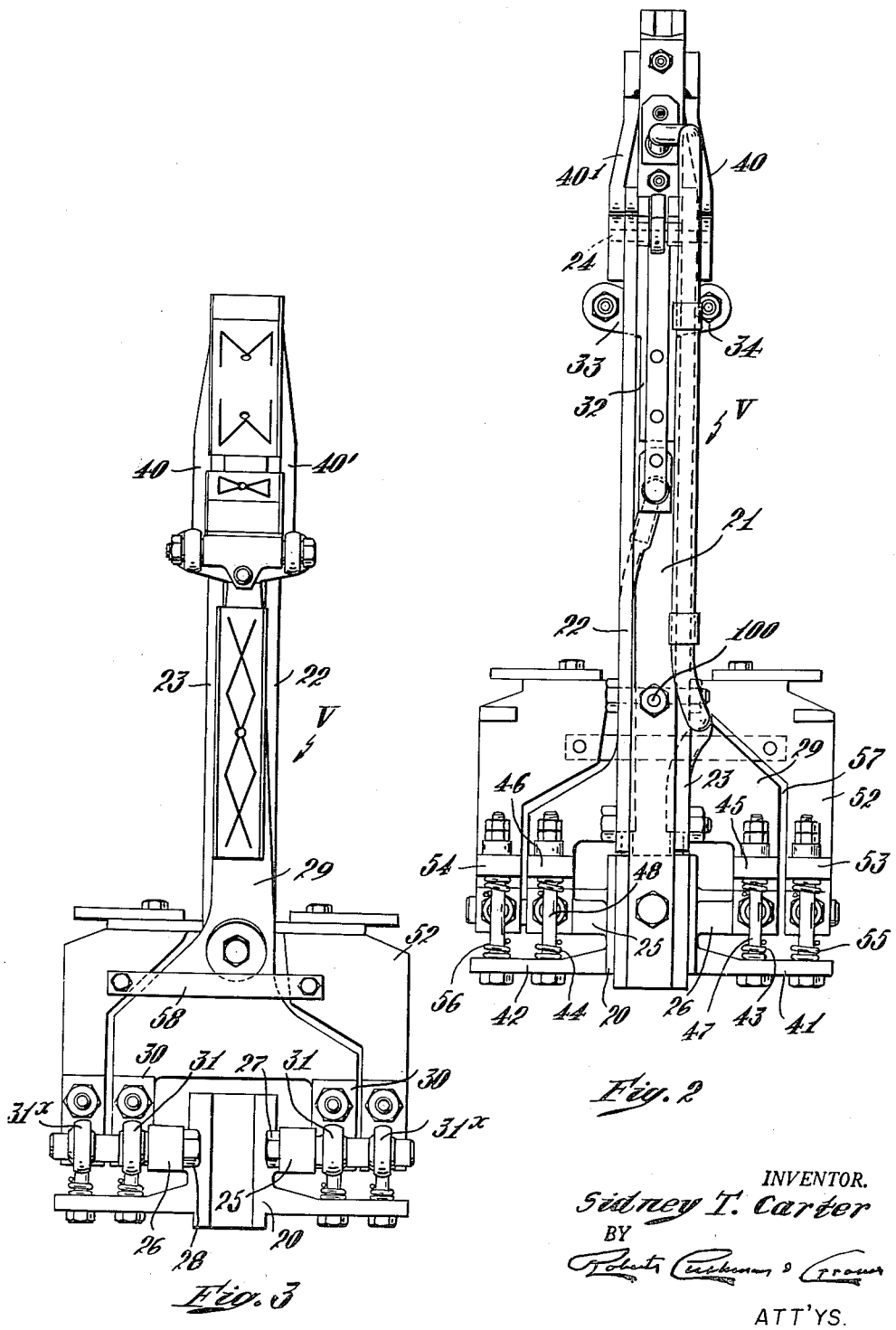

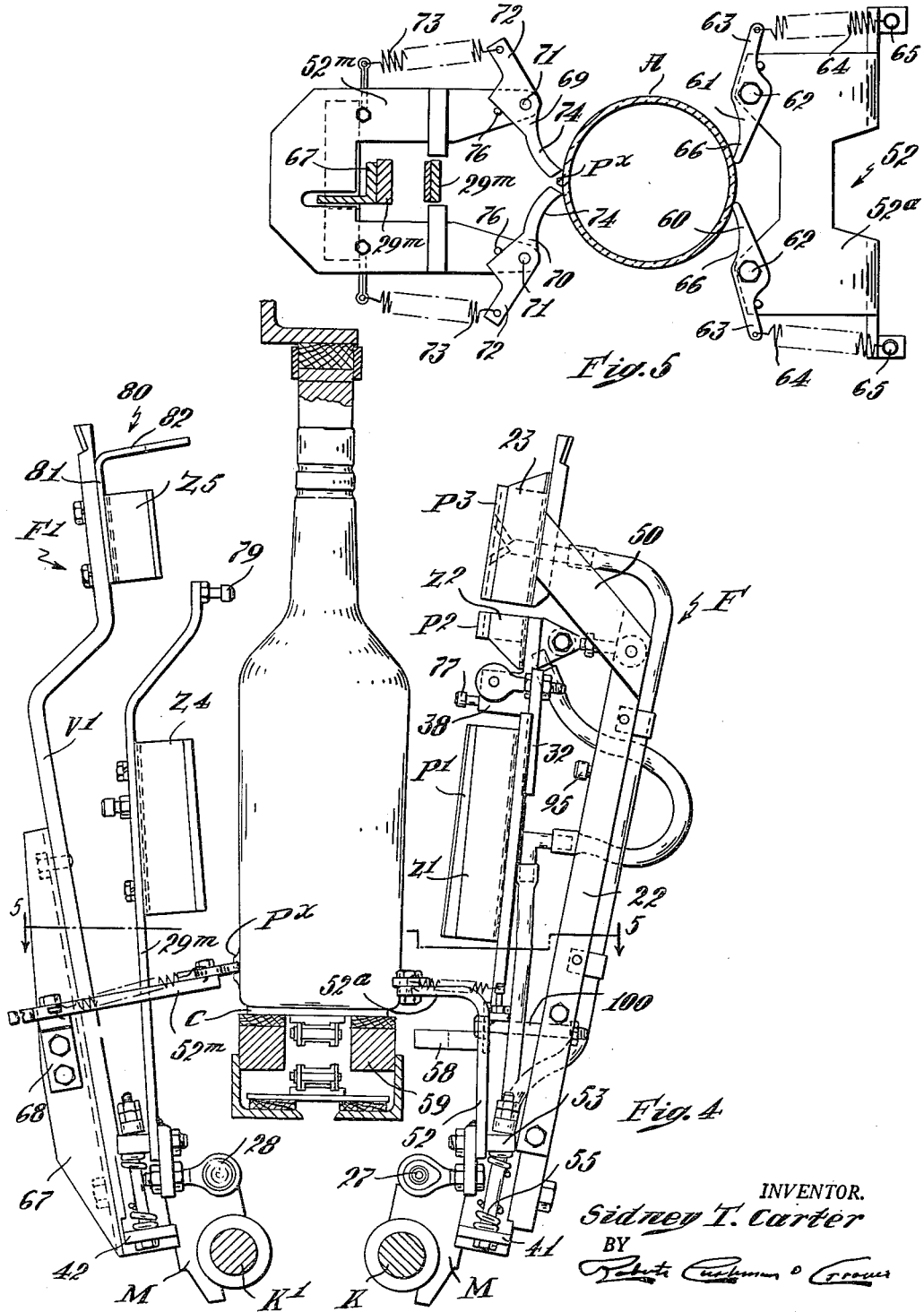

April 18, 1961 S. T. CARTER 2,980,278
BOTTLE SPOTTING APPARATUS FOR LABELING MACHINES
Filed July 27, 1959 7 Sheets-Sheet 4

INVENTOR.
Sidney T. Carter
BY
Roberts Cushman & Grover
ATT'YS.

April 18, 1961  S. T. CARTER  2,980,278
BOTTLE SPOTTING APPARATUS FOR LABELING MACHINES
Filed July 27, 1959  7 Sheets-Sheet 5
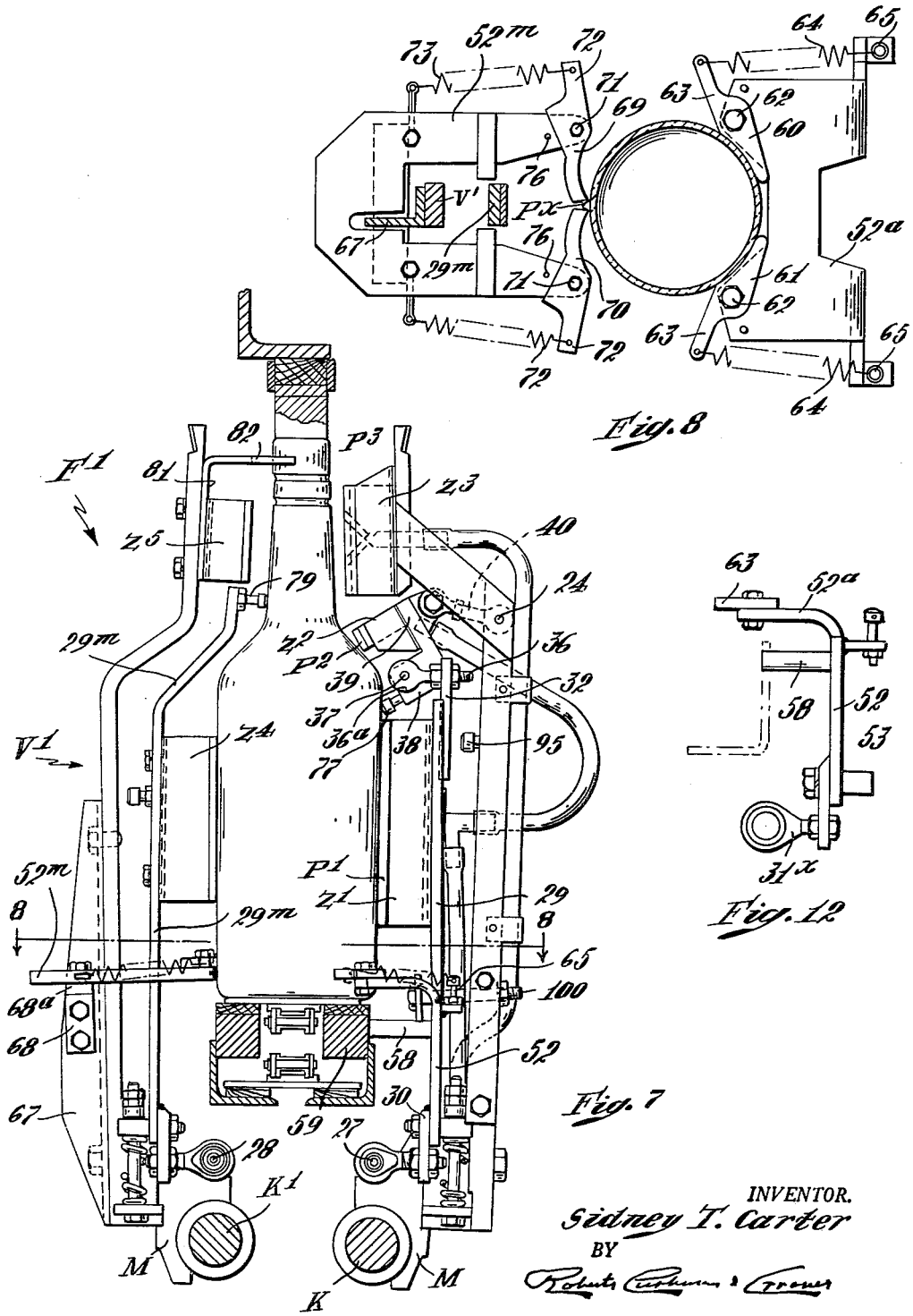

April 18, 1961 S. T. CARTER 2,980,278
BOTTLE SPOTTING APPARATUS FOR LABELING MACHINES
Filed July 27, 1959 7 Sheets-Sheet 6
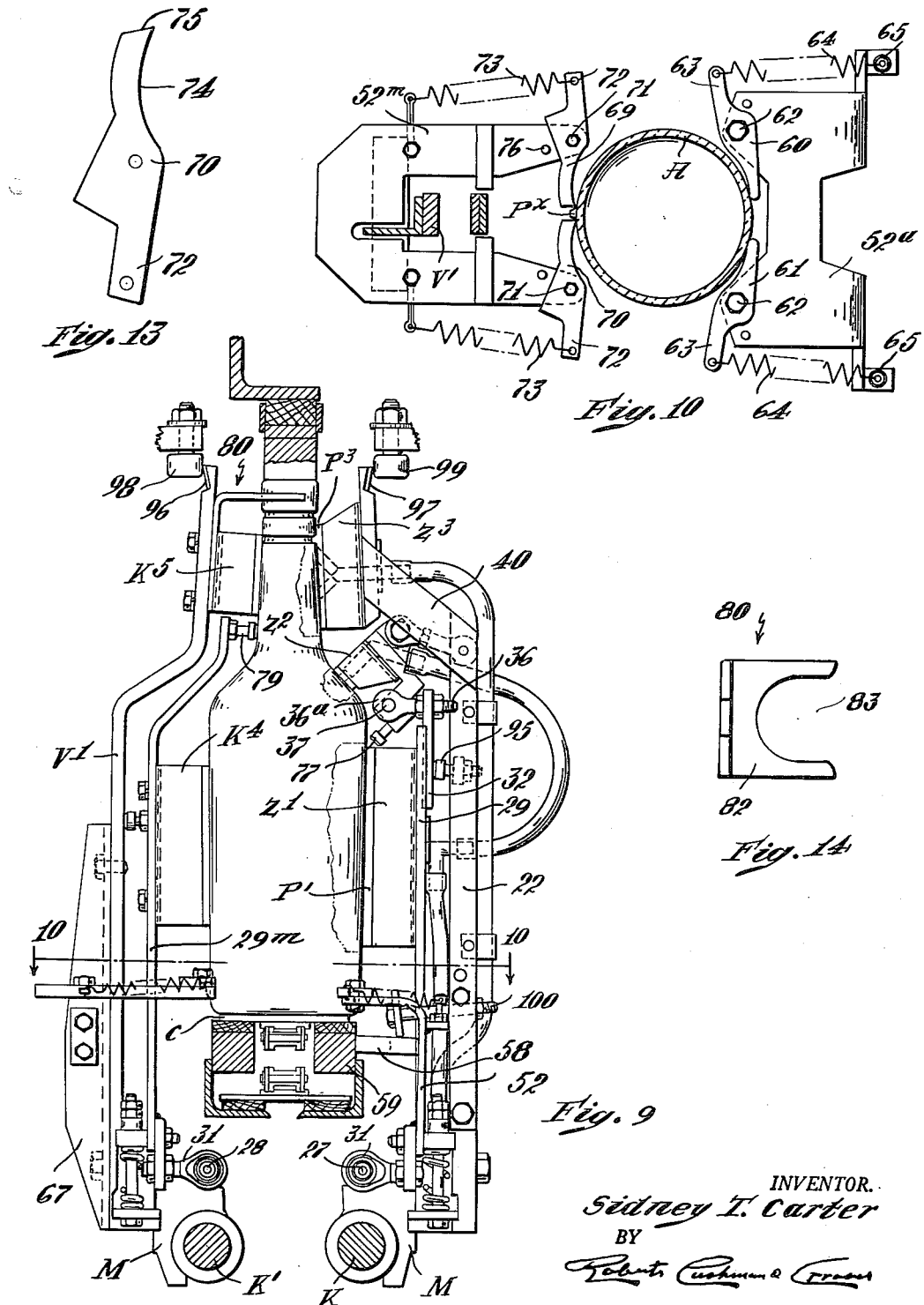
INVENTOR.
Sidney T. Carter
BY
Roberts Cushman & Grant
ATT'YS.

April 18, 1961 S. T. CARTER 2,980,278
BOTTLE SPOTTING APPARATUS FOR LABELING MACHINES
Filed July 27, 1959 7 Sheets-Sheet 7

INVENTOR.
Sidney T. Carter
BY
ATT'YS

United States Patent Office 2,980,278
Patented Apr. 18, 1961

2,980,278

BOTTLE SPOTTING APPARATUS FOR LABELING MACHINES

Sidney T. Carter, Shrewsbury, Mass., assignor to Geo. J. Meyer Manufacturing Co., Cudahy, Wis., a corporation of Wisconsin Filed July 27, 1959, Ser. No. 829,869

23 Claims. (Cl. 216—13)

This invention pertains to labeling machines of the kind wherein conveyor means moves articles uninterruptedly along a predetermined path through the field of operation of label-applying means which applies labels to the articles without interrupting their forward advance, an example of such a machine being that more fully disclosed in the copending application of Sidney T. Carter, Serial No. 551,012, filed December 5, 1955, now issued as Patent No. 2,940,630, dated June 14, 1960, the present invention relating more especially to improved means for spotting an article, for example a bottle, of approximately circular transverse section during the movement of the article through the field of operation of the labeling means.

In the patent to Carter 2,602,561, July 8, 1952, apparatus is disclosed whereby it is made possible to deposit a label upon an article, for example a round bottle, with great accuracy so that small medallion-like labels, for instance, may be placed in accurate registration, for example within a depression in the outer surface of the bottle of substantially the exact size to receive such a label, the apparatus therein disclosed comprising primary means operative roughly to orient the bottle before the latter arrives at the labeling zone, and secondary spotting means operative, while the bottle is actually in the labeling zone, to spot the bottle so that the label-receiving area is very accurately placed relatively to the label-applying element. However, the spotting apparatus disclosed in said patent requires, for its intended operation, that the article to be labeled dwell or stand substantially still while the label is being applied and while the final spotting is taking place; and thus the apparatus discosed in said patent is not applicable to a labeling machine such as that disclosed in the pending application above referred to, wherein the articles move uninterruptedly along a predetermined path through the labeling zone and the labels are applied to the moving article.

In the aforementioned copending application, article-orienting means is associated with the suction grip finger which takes the label from the picker blades and applies it to the bottle, but the article-orienting or spotting means disclosed in said application is such as to function only with articles which, in horizontal transverse section, are longer in one direction than in the other, and is not functionally capable of spotting a round bottle, for example, having the customary spotting bar or "tear-drop" on its peripheral surface.

In the copending application, Serial No. 815,878, filed May 26, 1959, by Sidney T. Carter for Grip Finger Assembly for Labeling Machines, there is illustrated a modification of the grip finger disclosed in the above-mentioned Patent No. 2,940,630, which is capable of applying both a body label and a shoulder label to an article, for example a bottle, of circular transverse section, but without any provision for spotting the bottle accurately just prior to the application of the label.

The present invention has for its principal object the provision of spotting means applicable to a machine wherein the articles move uninterruptedly through the labeling zone, and more especially to secondary orienting or spotting means operative, after a bottle of circular transverse section and having a spotting projection has received a preliminary orientation, to turn the bottle so that the specific area which is designed to receive the label shall be exactly registered with the label as the latter is moved into contact with the bottle. A further object is to provide secondary spotting means in associaion with a transfer pad, for instance a suction grip finger, so that the spotting means is necessarily actuated in exactly timed relation to the movement of the transfer pad and, as the bottle moves uninterruptedly along its path, the spotting means shall remain in operative engagement with the spotting projection on the periphery of the bottle so as to hold the bottle accurately oriented as the transfer pad completes its motion in bringing the label or labels into contact with the bottle. A further object is to provide a label-transfer device for use in a machine in which the labels are applied to an article while the latter moves uninterruptedly through the labeling zone, such that a body label, a shoulder label and a neck label may all be applied at the same instant to the moving bottle. Other and further objects and advantages of the invention will be pointed out in the following more detailed description and by reference to the accompanying drawings wherein:

Fig. 1 is a fragmentary vertical section, transversely of an article conveyor, showing, in end elevation, two grip finger assemblies, one at the right-hand and the other at the left-hand side of the conveyor, said assemblies being located in label-transfer position; for ease in illustration and description, but without limiting intent, it is assumed that labels will be supplied to the right-hand grip finger assembly only;

Fig. 2 is an elevation showing the outside of the right-hand grip finger, omitting other parts;

Fig. 3 is an elevation showing the inside of the right-hand grip finger, omitting other parts;

Fig. 4 is a view generally similar to Fig. 1, but showing the grip finger assemblies as having moved toward the conveyor sufficiently far so that the spotting jaws of the present invention have made initial contact with the peripheral surface of the bottle to me labeled;

Fig. 5 is a more or less diagrammatic horizontal section on the line 5—5 of Fig. 4;

Fig. 7 is a view generally similar to Fig. 6, but showing the left-hand grip finger as having contacted the bottle thereby to provide an abutment to resist the pressure exerted by the label pad of the right-hand grip finger in applying the label, and showing the shoulder label pad as having swung downwardly toward the bottle shoulder in releasing the body label pad to complete its advance;

Fig. 8 is a more or less diagrammatic horizontal section on the line 8—8 of Fig. 7, showing the spotting jaws of the present invention as contacting the spotting rib of the bottle;

Fig. 9 is a view similar to Fig. 7, but showing the grip finger assemblies as having completed their inward motion, with the body, shoulder and neck label pads of the right-hand assembly in label-applying position;

Fig. 10 is a more or less diagrammatic horizontal section on the line 10—10 of Fig. 9, showing the spotting devices as having completed their intended function and holding the bottle in accurately registered relation for the reception of the labels;

Fig. 12 is a side elevation illustrating a support for a pair of bottle-centering fingers;

Fig. 13 is a plan view showing details of one of a pair of spotting fingers;

Fig. 14 is a plan view of a neck guide operative to prevent tipping of the bottle in a front-to-rear direction.

Figure 11:
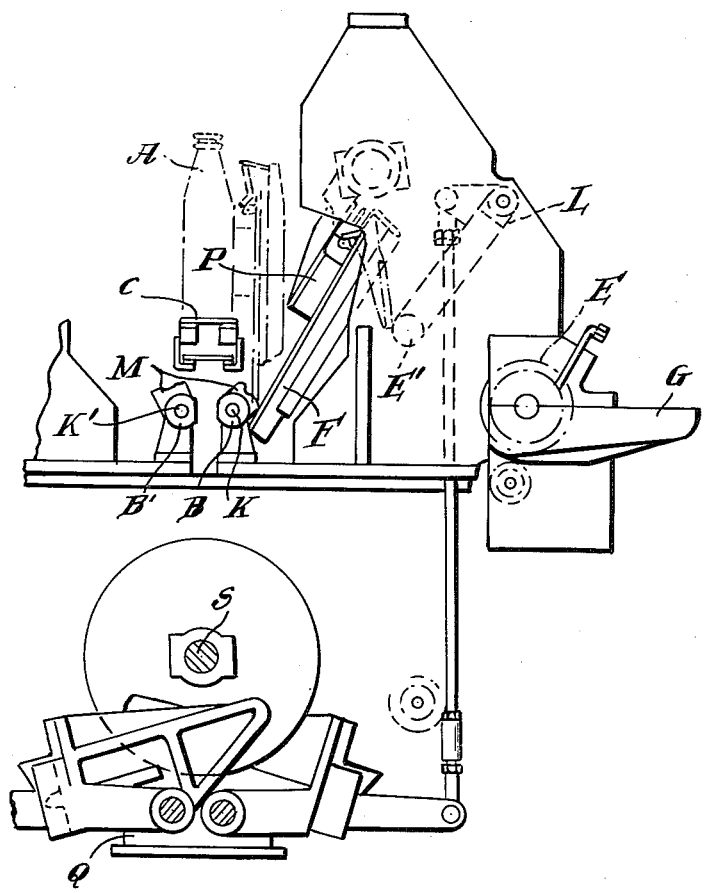
Fig. 11 is a fragmentary diagrammatic end elevation, partly in section, of a labeling machine of the type wherein the present invention is useful, showing, in full lines, a picker and grip finger assembly at a transfer station, the grip finger assembly being diagrammatically indicated.

Referring to Fig. 11 of the drawings, the character Q indicates the base portion of the frame of a machine, such, for example, as that disclosed in Patent No. 2,940,630, June 14, 1960, above referred to, said frame supporting various parts, including bearings for the main shaft S, upon which are mounted cams (not shown) for actuating those elements of the machine which go through a predetermined cycle once for each rotation of the shaft S in functioning to apply a label. The machine, only one side of which is fully shown in Fig. 11, is designed to apply labels simultaneously, if desired, to the front and rear sides of an article, such as the bottle A, while the latter is supported in upright position upon the conveyor C, the latter being driven so as to move the bottle uninterruptedly along a predetermined path through various operating zones including the field of action of label-applying means. At opposite sides of the machine gum boxes G are arranged, only one appearing in Fig. 11, and in each gum box there is a gum-elevating roll E which supplies gum to a corresponding transfer element E', for instance a freely rotatable roll, which is carried by a rocking lever L so as to transfer gum from the elevating roll E to the surface of the picker P, here indicated diagrammatically. The picker is desirably of the type more fully described in the patent to Holm, No. 1,901,101.

The picker P (Fig. 11) receives a coating of adhesive from the transfer roll E' while its blades are closed and is then swung so as to contact its gummed surface with the endmost label in the magazine (not here shown), the magazine having compartments for body, shoulder and neck labels, respectively. The blades of the picker open while contacting the endmost labels in the several magazine compartments thereby to spread the adhesive, and it then swings back to the position illustrated in full lines in Fig. 11 where its relatively movable blades remain separated, with the end portions only of the label adhering to the respective blades. While the picker is at this transfer station, as illustrated in full lines in Fig. 11, the label-contacting faces of the blades are disposed in a plane which inclines downwardly and toward the vertical plane through the axis of the bottle A as the latter stands in position to receive the label. As shown in Fig. 11, the transfer station, represented by the full-line position of the picker P, is spaced a substantial distance from the bottle which is to receive the labels. While the picker P dwells in the position shown in full lines in Fig. 11, a grip finger assembly F (diagrammatically indicated in this view) is moved in a counterclockwise direction so as to contact its label-transfer pads with the labels carried by the picker. The grip finger F then continues its upward motion in a counterclockwise direction, passing between the opened blades of the picker and carrying the gummed labels with it, and eventually, as indicated in broken lines in Fig. 11, pressing the labels into contact with those portions of the bottle surface which are to receive them, while the picker returns for the reception of a fresh coating of gum. If, as herein illustrated, the machine is designed to apply labels to the front and rear faces of the same bottle, then magazines and grip finger assemblies will be arranged at opposite sides of the conveyor path. However, even though labels are not to be applied to both sides of the same bottle, and label magazines are arranged at one side only of the conveyor path, grip finger assemblies are desirably provided at both sides of the conveyor path as here shown (Figs. 1, 4, 6 and 7), since the idle grip finger assembly, which does not apply labels, may then function usefully as abutment means to prevent tipping of the bottle as the labels are applied by the other grip finger assembly.

In accordance with the present invention as herein disclosed by way of example, the right and left grip fingers are slightly different in certain details, although basically similar. Each grip finger assembly F and $F^1$ (Fig. 1) is secured, at its lower end, to a corresponding rock arm M (Fig. 11) fixed to a shaft K, or $K^1$, respectively, these shafts being arranged to rock and also to move endwise in suitable bearings B and $B^1$ (Fig. 11). Any suitable means, receiving its motion from the main shaft S (Fig. 11) may be employed for imparting these movements to the rock shafts—for example, such means as is more fully disclosed in the above named Patent No. 2,940,630.

As here illustrated, the right-hand grip finger assembly F includes three label-applying pads $P^1$, $P^2$ and $P^3$, respectively; the pad $P^1$ being designed to apply the body label, the pad $P^2$ to apply a shoulder label, and the pad $P^3$ to apply a neck label. The pads $P^1$, $P^2$ and $P^3$ are mounted upon supporting blocks $Z^1$, $Z^2$ and $Z^3$, respectively. Each of these pads is provided with suction orifices or ports of customary type (not here specifically illustrated), and these ports are connected by tubing T, $T^1$ (Fig. 1) to suitable means, not here shown, for example an air pump equipped with automatically operating valves, which establishes suction at these ports at the proper times in the cycle to enable the pads to take the labels from the pickers, the suction at these ports being broken at the proper times in the cycle to permit the pads to leave the labels in adhering contact with the bottle, while the grip finger assembly returns to the transfer station. As here illustrated (Fig. 1), the grip finger assembly $F^1$ at the left-hand side of the conveyor is not provided with label-applying pads, although supports $Z^4$ and $Z^5$ for body and neck label pads are illustrated.

Each of the grip finger assemblies F and $F^1$ comprises a base portion 20 (Figs. 2 and 3) which may be a casting suitably shaped for rigid connection to the corresponding rock arm M. To this base 20 is fixed a rigid, upwardly extending part 21, desirably of rectangular transverse section, which may be an integral part of the base casting or a length of bar stock, for example of steel, welded or otherwise rigidly secured to the base casting. This member 21 forms the lower portion of an upwardly extending rigid arm V (Figs. 2 and 3) which, as here illustrated, also comprises spaced parallel rigid bars 22 and 23 whose lower portions are bolted to the member 21, and which extend upwardly and, at their upper ends, are connected (Fig. 2) by a pin 24 whose ends are welded or otherwise permanently secured to the members 22 and 23, thus providing a rigid structure which partakes of the rocking motion of the rocker arm M to which the base 20 is secured, and which is fixed to one of the parallel rock shafts K or $K^1$, respectively.

Considering, for purposes of description, that the member 21 is at the rear or outside of the right-hand grip finger assembly F, the base 20 has forwardly directed integral bracket arms 25 and 26 (Figs. 2 and 3) which are spaced apart at their forwards ends and which have axially aligned bores for the reception of fixed pivot pins 27 and 28, respectively, which define a fulcrum axis about which may rock the main lever 29 (Fig. 1) to which is fixed the support $Z^1$ for the body label pad $P^1$. Transversely spaced blocks 30 are fixed to the lower end portion of this main lever 29 (Fig. 3), these blocks being at the forward or inner side of the grip finger assembly and being spaced apart transversely a distance to receive between them the bracket arms 25 and 26. These blocks 30 are fixed to the lever proper by bolts or by welding and have adjustably secured thereto forwardly projecting bearing brackets 31 having axially aligned bores for rotatably receiving the pins 27 and 28 respectively, the lever 29 thus being supported by the base to rock about the axis defined by the pins 27 and 28. A bracket 32 (Figs. 1, 2, 4, 6, 7 and 9) is attached to the lever 29, at the upper part of the latter, desirably with bolt and slot connections (not shown) so that it may be adjusted up or down relatively to the lever 29. This bracket 32 is provided with laterally directed arms 33 and 34 (Fig. 2) having bores in which are fixed the screw-threaded end portions of stem members 36 (Figs. 7 and 9) integral with bearing brackets 36a (Figs. 7 and 9) which receive oppositely directed pintle members 37 projecting from opposite ends of the horizontal portion 38 (Fig. 7 of a right-angled, auxiliary lever device having the upwardly directed arm 39 (Fig. 7) upon which is mounted the carrier $Z^2$ for the shoulder label pad $P^2$.

A link 40 (Fig. 7) of adjustable length is pivotally connected at its inner end to the upper end of the arm 39 of the auxiliary lever and at its outer end has a bearing opening for the reception of the pin 24 which connects the members 22 and 23 of the frame of the grip finger assembly.

The base 20 is provided also (Figs. 2 and 3) with laterally projecting arms 41 and 42 upon which rest the lower ends of coiled compression springs 43 and 44, the upper ends of the springs bearing against blocks 45 and 46, respectively, which project rearwardly from the lower end of the lever 29. Desirably these springs embrace bolts 47 and 48 which extend through aligned openings in the brackets 41, 45 and 42, 46, respectively, these bolts having nuts at their lower ends which constitute stops to limit the forward swing of the lever 29 away from the upright arm V constituted by the parts 20, 22 and 23, the springs 43, 44 thus tending to swing the lever 29 inwardly away from the upright arm V.

Figure 1:
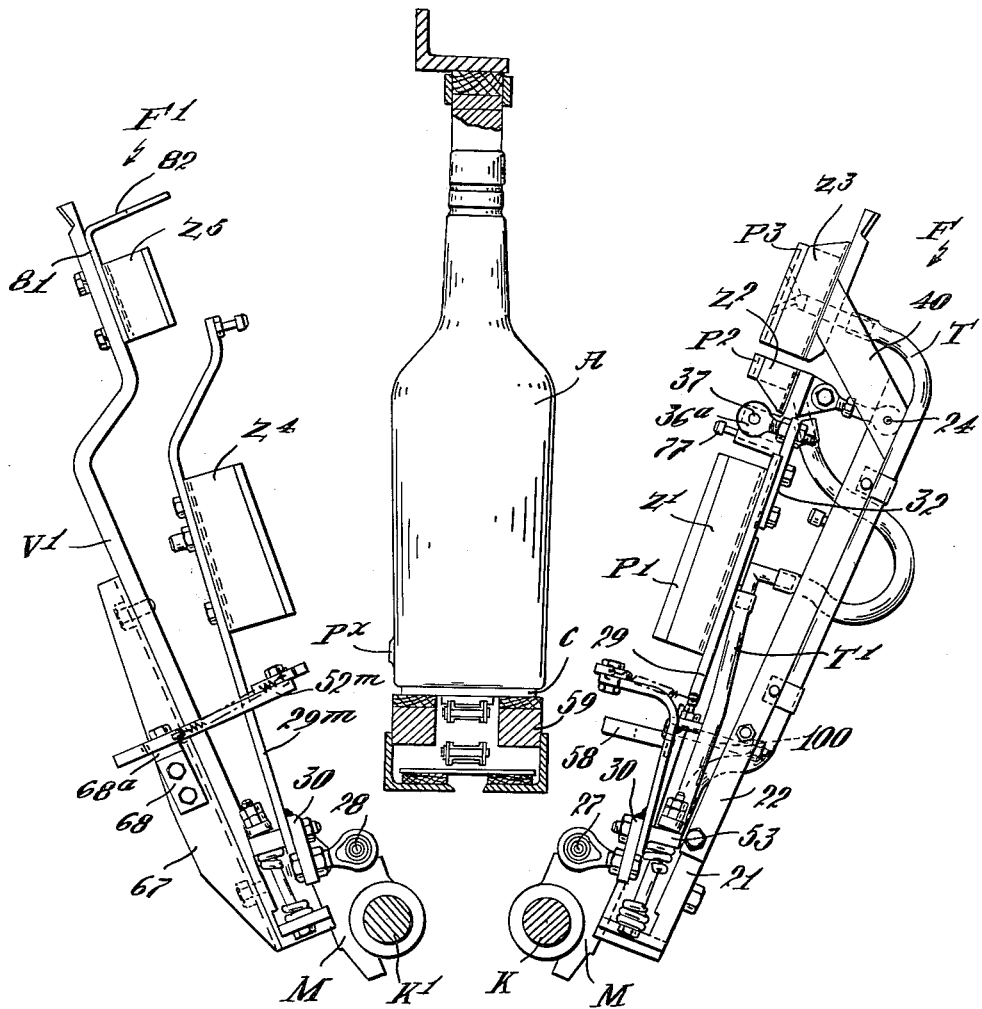

It will be noted, by inspection of Fig. 1, which shows the grip finger assemblies in transfer position, that is to say the position at which the label-applying pads receive labels from the picker, that the label-contacting faces of the pads $P^1$, $P^2$ and $P^3$ are all in the same plane, this arrangement making it possible for the grip finger assembly to take the several labels from the picker without danger of dropping them or injuring them. It will also be noted, by inspection of Fig. 1, that the axis of the rock shaft K, about which the grip finger assembly F rocks, is at a substantial distance below the horizontal plane of the surface of the conveyor C which supports the bottle, and that the axis of this rock shaft K is in a vertical plane which is substantially tangent to the body portion of the bottle at that area of the body-portion to which the label is to be affixed. Moreover, the axes of the pins 27 and 28, which define the fulcrum axis for the lever 29, are also in this same vertical plane at the instant (Fig. 9) at which the grip finger assembly arrives at the label-applying position.

In accordance with the present invention, the support $Z^3$ for the neck label pad $P^3$ is carried by rigid brackets 40 and 40¹ (Figs. 1, 2, 3 and 9) which are fixed to the upper ends of the members 22 and 23, respectively, so that the support $Z^3$ for the neck label pad rocks through the same arc as does the support $Z^1$ for the body label pad.

The arm X, comprising the bars 22 and 23, and the relatively movable lever 29 are limited in their motion away from each other, by an adjustable bolt 100 (Fig. 1), and are at their furthest distance apart when the assembly F is at the transfer station, it being noted that the springs 43 and 44 constantly urge the arm and lever apart. This bolt 100 provides for a fine adjustment of the parts so that the label-contacting surfaces of the pads may be placed in accurate alignment at the transfer position.

In accordance with the present invention, another member 52 (Fig. 2) is mounted to rock about the axis of the studs 27 and 28 upon which the lever 29 rocks. The part 52 has inwardly projecting bearing brackets 31x (Figs. 3 and 12) which turn on the studs 27 and 28, and has outwardly projecting blocks 53 and 54 (similar to the blocks 45 and 46) which form abutments for the upper ends of springs 55 and 56 whose lower ends bear upon the arms 41 and 42, thus urging the member 52 to swing toward the conveyor in the same way as does the lever 29. Bolts within the springs 55 and 56, having nuts at their upper ends, provide means for limiting the amount of relative movement of the upright arm V and the part 52. As indicated in Fig. 2, the part 52 is so shaped as to provide clearance at 57 between it and the lower part of lever 29, so that these parts may move relatively without interference. The part 52 is provided, at the inner side of the grip finger assembly F, with a stop member 58 (Figs. 1 and 9) desirably of nylon or some similar material, which, by contact with one of the supports 59 for the conveyor, limits inward motion of the member 52 toward the conveyor. As the grip finger assembly moves along the conveyor, together with rock-shaft K, while affixing and holding the label in contact with the bottle, the member 58 slides along the side of the support 59.

The part 52 (Fig. 12) has a horizontal flange portion or table 52a which supports a pair of bottle-centering fingers 60 and 61 (Figs. 5, 8 and 10). These fingers are pivotally mounted on the flange 52a by means of pins or bolts 62, each finger comprising an arm 63 to which a coiled tension spring 64 is secured, the springs being anchored to pins 65 carried by the part 52a and tending to swing the respective fingers 60 and 61 toward a bottle standing on the conveyor. As seen in Fig. 5, each of the centering fingers 60 and 61 is provided with an arcuate bottle-contacting edge 66 desirably of approximately the same radius of curvature as that of the body of the bottle, for contact with the peripheral surface of the bottle.

The grip finger assembly $F^1$, which is shown at the left-hand side of the conveyor as viewed, for example, in Fig. 4, is basically generally similar to the grip finger assembly F, but, as above noted, is not here shown as provided with label-carrying pads, although it does have pad-supporting elements $Z^4$ and $Z^5$ capable of carrying a body pad and a neck label pad, if desired. As here illustrated, and as above pointed out, the left-hand grip finger assembly $F^1$ comprises the rock arm M, which is fixed to the rock shaft K' which is rocked in time with the shaft K but in the opposite direction. The rock arm M carries a base casting like the base casting 20, to which is fixed the lower end of an upstanding rigid arm V', desirably like the arm V of the grip finger assembly F, and the base casting also carries spaced pintle pins 27 and 28, like those previously described, forming a pivotal support upon which the lever 29m, similar to the lever 29 above described, may rock toward and from the conveyor C. However, the grip finger assembly F' does not have any part corresponding to the part 52, above described, but instead, a vertically elongate (Fig. 4) angle bar 67 has one flange fixed to the upstanding arm V' (Figs. 4 and 7), while its outwardly extending flange supports an angle bracket 68 to whose upper arm 68a is secured a generally U-shaped plate or table 52m (Figs. 5, 8 and 10) corresponding generally in function to the table 52a of the right-hand grip finger assembly F.

Spotting levers or fingers 69 and 70 are pivotally mounted upon the end portions of the respective legs of the U-shaped table 52m by means of pins or bolts 71, each finger having an outwardly directed arm 72 to which one end of a coiled tension spring 73 is attached, the other ends of these springs being anchored to anchorages fixed to the table 52m. Each of these spotting fingers is provided with a concave inner edge 74 (Fig. 5) and with an operative substantially rectilinear end surface or jaw 75 (Fig. 13) designed to engage a spotting projection or tear-drop PX (Figs. 1, 4, 5, 6, 8 and 10) on the peripheral surface of the bottle A which is to be oriented.

The table 52m which supports the spotting fingers 69 and 70, and which is rigidly mounted on the arm V', is of such dimensions and so located that as the rock shaft K¹ completes its rocking motion in a clockwise direction, so that the parts attain the final relative positions illustrated in Figs. 9 and 10, the jaws of the spotting fingers are positioned accurately to hold the spotting projection Px in the desired position of orientation as shown in Fig. 10 at which the center of the spotting projection is accurately located in that vertical radial plane of the bottle which is perpendicular to the article path. Pins 76, projecting upwardly from the plate 52m, provide limiting stops for the spotting arms 69 and 70 such that their jaws 75 are spaced, when the grip-finger assembly is approaching the bottle, as shown in Fig. 5, sufficiently to provide room for the admission of a spotting projection Px which is nearly, but not exactly, in the desired position.

An adjustable stop member 77 (Figs. 1, 6 and 7) is mounted on the lower member 38 of the lever which supports the shoulder label pad P², this stop being operable, by contact with the bottle, temporarily to delay contact of the body label pad with the bottle thereby to gain time for the spotting fingers to function before the body label actually comes into contact with the bottle, it being obvious that the spotting must be fully completed before any label is pressed against the bottle.

As above noted, the only function of the supports Z⁴ and Z⁵, in the illustrated embodiment, is to form an abutment for the bottle while the body and neck labels are being pressed against the bottle. In order to provide a further support to prevent transverse tipping in response to the pressure exerted by the shoulder and neck labels, an abutment member 79 (Figs. 1 and 9) may be fixed to the upper end of the lever 29m. For steadying the bottle to prevent front-to-rear tipping, a neck guide 82 (Fig. 14) may be provided, this neck guide comprising a flange portion 81 (Figs. 1 and 4), which is secured to the upper part of the arm V', and a flange 82 substantially at right angles to the flange 81, and which is shaped to provide a recess 83 (Fig. 14) for the reception of the upper portion of the bottle neck, thus effectively preventing the bottle from tipping to the front or rear as it travels along the conveyor path.

It is assumed that the apparatus herein disclosed is for the purpose of performing a secondary or final spotting operation, such as to position the bottle in very accurately oriented position and to hold it in such position just as the label or labels are applied, and that, before reaching the label-applying zone, the bottle will have been at least approximately oriented or spotted by the employment of some other means, for example such means as is more fully disclosed in the patent to Carter No. 2,825,442, dated March 4, 1958.

It will be understood that, if body and/or shoulder labels are to be applied to opposite sides of the bottle, the supports Z⁴ and Z⁵ of the left-hand grip-finger assembly, F¹, will be supplied with label-receiving pads and suction connections like those of assembly F. Moreover, if the labeling machine is intended to apply labels simultaneously to each of a plurality of articles, employing a corresponding number of sets of grip-finger assemblies, the grip-finger assemblies of each such set will be of the kind herein disclosed.

In the operation of the apparatus herein disclosed, and assuming that the conveyor C is constantly moving and carrying a succession of bottles A along a predetermined path parallel to the axes of the rock shafts K and K' and that the latter are rocked back and forth in opposite directions during each cycle and in properly timed relation, it may be assumed that, at the beginning of a cycle, the grip finger assemblies F and F' occupy the relative positions shown in Fig. 1, at which the several label-applying pads P¹, P² and P³ have their label-contacting surfaces in the same plane, and that a picker P (Fig. 11), carrying corresponding gummed labels, will have been positioned so that the several labels may be picked off from the picker by the suction pads P¹, P² and P³, and that instantly thereafter the grip finger assemblies F and F¹ will begin to move toward the bottle A. It may be assumed that, as shown in Fig. 1, the bottle is advancing toward the observer and has not as yet arrived at a position directly between the grip finger assemblies. However, it will be understood that by the time the grip finger assemblies have arrived at the relative positions shown in Figs. 4 and 5, the bottle will have so advanced that its spotting projection Px will be opposite the spaced jaws 75 of the spotting fingers 69 and 70 (Fig. 15a), while the tips of the centering fingers 60 and 61 will have first contacted the surface of the bottle as shown in Fig. 5.

Figure 6:
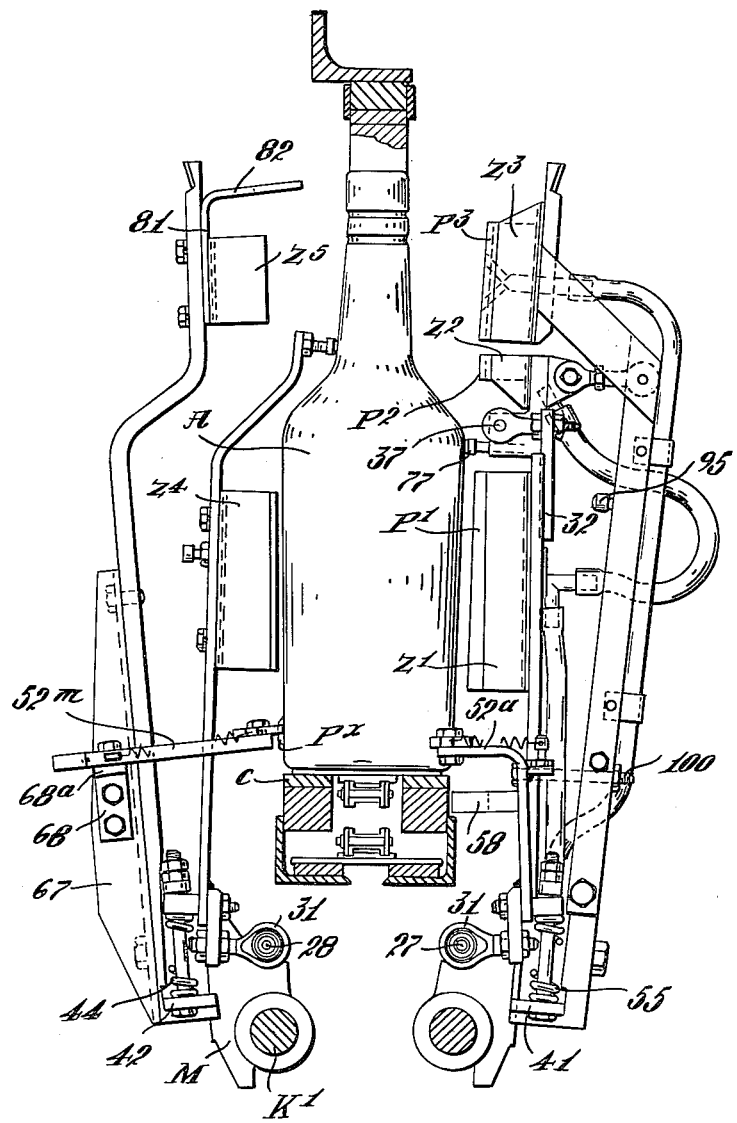
Fig. 6 is a view generally similar to Fig. 4, but showing the grip finger assemblies as having more nearly approached the bottle until temporarily stopped to permit initiation of the actual spotting operation.

As the bottle continues to advance, the grip finger assemblies F and F' move along the conveyor path toward the observer, as seen in Fig. 4, at the same linear velocity as the bottle; and as the grip finger assemblies reach the position shown in Fig. 6, the stop number 77 comes into contact with the bottle, so that body label pad P¹ is temporarily restrained from bringing its label into contact with the bottle. At approximately this time the concave edges 66 of the centering fingers 60 and 61 come into embracing contact with the bottle as shown in Fig. 8, thus keeping the axis of the bottle accurately centered with reference to the center of the pad P¹, while at least one of the jaws 69 or 70 will have contacted the spotting projection Px (Fig. 15b).

Figure 15:
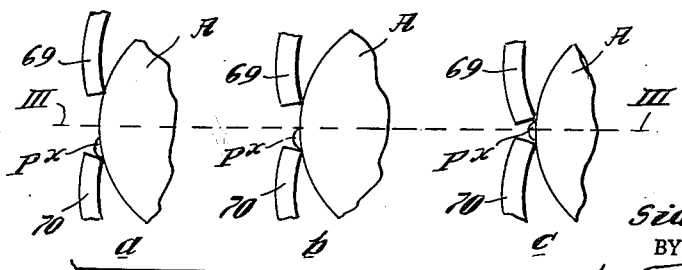
Fig. 15 is a diagram, illustrating successive relative positions of a spotting projection on a bottle resultant from the action of the orienting jaws of the present invention.

In the final position of the parts, as shown in Figs. 9, 10 and 15c, the spotting projection Px on the bottle is now held between the jaws of the two spotting fingers in the position in which it has been placed by the approach of the finger tips in reaching the position shown in Figs. 10 and 15c, while the abutment member 77 has tipped down and permitted the several label-applying pads to bring their labels into adhering contact with the bottle, the latter being properly supported against tipping in response to the label-applying pressure by the parts Z⁴, Z⁵, 79 and 80. As the rock arm moves from the position of Fig. 7 to that of Fig. 8, the pin 27 moves to the left, and since member 58 is already in contact with fixed part 59, the part 52 rocks about the part 58 as a fulcrum, thus moving part 52a and the arms 60 and 61 to the position shown in Fig. 10. The final relative position of the rigid arm V is determined by an adjustable stop member 95 (Fig. 9) and, if desired, during the final application of pressure, the upper ends of the rigid arms of the two grip finger assemblies may, as shown at 96 and 97 (Fig. 9), be engaged with rolls 98 and 99, respectively, carried by fixed supports, and which are so positioned that, as the parts 96 and 97 pass between them, positive pressure is applied for insuring the adhesion of the labels to the bottle. It may be understood that the parts 96, 97, 98 and 99 form no essential part of the present invention.

Immediately after the labels have been affixed and sufficiently pressed against the bottle, the grip-finger assemblies F and F¹ move reversely along the article path and outwardly to the positions shown in Fig. 1, while the bottle, to which the labels have been applied, continues to advance along the conveyor path while standing on the conveyor C.

It may be noted that if a hold-down, such for example, as that disclosed in the above referred to copending application, Serial No. 551,012, or in fact any other usual type of hold-down or head-grip be employed, the pressure exerted by such device will be relieved at least during that period of the travel of the bottle which is indicated by its successive positons as diagrammatically illustrated in Fig. 15a and Fig. 15c, that is to say, while the bottle is being oriented to its final position, the hold-down pressure being re-established as seen as the bottle reaches the final position of orientation and while the labels are actually being applied.

While one desirable embodiment of the invention has herein been illustrated by way of example, it is to be understood that the invention is broadly inclusive of any and all modifications falling within the scope of the appended claims.

I claim:

1. A machine for labeling bottles of substantially circular transverse horizontal section and each provided with a spotting element and wherein a conveyor uninterruptedly moves the bottles to be labeled along a predetermined path, while standing upright, through the field of action of label-applying means and wherein a label-affixing pad takes a label from a picker at a transfer station and places it in affixing contact with a bottle as the latter moves along said path, the machine comprising a pair of rock shafts, located at opposite sides respectively of and parallel to the article path, and means operative simultaneously to rock said shafts in opposite directions, said shafts also being capable of endwise movement, and means operative at times to move said shafts axially at the same linear velocity as the conveyor, a support fixed to one of the said rock shafts and which carries the label-affixing pad, a support fixed to the other rock shaft, and bottle-orienting means mounted upon said last-named support, said orienting means comprising opposed parts cooperable with the spotting element of the bottle, as the support approaches the article path, and thereby to turn the bottle until the center of the spotting element is in a plane which is perpendicular to the article path.

2. The combination according to claim 1, and wherein the orienting means is designed for cooperation with a spotting element which projects from the peripheral surface of the bottle, the parts which cooperate with the spotting element to turn the bottle being relatively movable jaws which receive the spotting element between them and which are effective to complete the orientation of the bottle just prior to the contact of the label with the bottle.

3. The combination according to claim 1, wherein the support for the bottle-orienting means is carried by a part which is fixed to that rock shaft which is at the opposite side of the article path from the rock shaft upon which the support for the label-affixing pad is mounted, and an abutment member carried by that rock shaft which supports the orienting means, and which is operaitve, by contact with the bottle, to support the bottle in opposition to the thrust exerted by the pad in affixing the label.

4. The combination according to claim 1, further characterized in having means which moves toward and from the article path concomitantly with the motion of the label-affixing pad and which is operative to prevent transverse shift of the axis of the bottle during the functioning of the orienting means.

5. A machine for labeling bottles of substantially circular transverse horizontal section and each provided with a spotting element and wherein a conveyor uninterruptedly moves the bottles to be labeled along a predetermined path, while standing upright, through the field of action of label-applying means and wherein a label-affixing pad takes a label from a picker at a transfer station and places it in affixing contact with a bottle as the latter moves along said path, the machine comprising a pair of rock shafts, located at opposite sides respectively of and parallel to the article path, and means operative simultaneously to rock said shafts in opposite directions, said shafts also being capable of endwise movement, and means operative at times to move said shafts axially at the same linear velocity as the conveyor, characterized in that a base member is fixed to each respective rock shaft, the label-affixing pad being carried by a part which is pivotally mounted on one of said base members, a supporting table which is also pivotally mounted on the last-named base member and bottle-centering means carried by said table, a part which is pivotally mounted upon the other base member, and an abutment element carried by said last-named part, an upright arm is attached to the last-named base member and a supporting table fixed to said arm, and article-orienting means mounted on said last-named table.

6. The combination according to claim 5, wherein the bottle-centering means comprises a pair of pivotally mounted arms, each having a concavely curved bottle-contacting edge of a radius of curvature approximating that of the periphery of the bottle, spring means tending to swing said arms in opposite directions and so that their free ends are directed toward the article path, and means for limiting such motion of the arms.

7. The combination according to claim 6, wherein the free ends of the arms of the bottle-centering means are disposed at equal distances from and at opposite sides respectively, of a plane perpendicular to the article path and which passes through the center of the label-affixing pad.

8. The combination according to claim 6, wherein the bottle-centering means comprises a pair of relatively movable members located equidistantly from a vertical plane perpendicular to the article path and passing through the center of the label-affixing pad, each of said movable members being so shaped as partially to embrace the bottle when in contact therewith, and means operative resiliently to press said members against the bottle as the label carrier approaches the label-affixing position.

9. The combination according to claim 2, wherein the relatively movable jaws are the end portions of a pair of pivotally mounted arms, each such end portion being of such shape, and by contact with the spotting element on a bottle, effectively to apply turning force to the bottle, spring means urging the said jaws away from each other, and means operative to limit such motion, the jaws when most remote from each other, being spaced sufficiently to receive between them the spotting projection of a bottle which is inaccurately oriented so that its spotting projection is not in a plane exactly perpendicular to the article path, the arc of motion of the support for the orienting means being such that as said arms approach the article path the jaws receive the spotting projection between them and turn the latter until the center of the projection is in a plane accurately perpendicular to the article path.

10. The combination according to claim 1, wherein the parts which cooperate with the spotting element to turn the bottle are the ends of a pair of pivotally mounted arms, said ends of the arms being always disposed equidistantly from a vertical plane perpendicular to the article path and passing through the center of the label-affixing pad, means operative, while the support for the orienting means is remote from the article path, to hold said ends of the arms spaced apart a distance substantially exceeding the thickness of the spotting projection on the bottle, and means whereby, as the support for the orienting means approaches the article path, said ends of the arms are moved toward each other and into gripping relation to a spotting projection interposed between them.

11. A machine for labeling bottles of substantially circular transverse horizontal section and each of which is provided with a spotting projection, and wherein a conveyor uninterruptedly moves the bottle to be labeled along a predetermined path, while the bottle is standing upright, through the field of action of label-applying means, and wherein a label-affixing pad takes a label from a picker at a transfer station and places the label in contact with a bottle as the latter moves along said path, the machine having a pair of rock shafts located at opposite sides of and parallel to the article path and means operative, simultaneously to rock said shafts in opposite directions, said shafts also being capable of endwise motion, and means operative to move said shafts axially, at times, at the same linear velocity as the conveyor, a grip finger assembly mounted on each respective shaft, one at least of said grip finger assemblies including the aforesaid label-affixing pad and one at least of the grip finger assemblies including article-orienting means, cooperable with the spotting projection on the bottle to turn the bottle into accurate, label-receiving position just prior to the application of the label to the bottle by the carrier.

12. The combination according to claim 11, wherein one grip finger assembly includes the label-affixing pad and the other grip finger assembly includes an abutment member operative, by contact with the bottle, to resist thrust applied by the label affixing pad in pressing a label against the bottle, and bottle-orienting means, cooperable with the projection on the bottle, which is included in one of said grip finger assemblies, said orienting means being so constructed and arranged as to place the spotting projection on the bottle in a plane accurately perpendicular to the article path and passing through the center of the label-affixing pad just prior to the contact of the label with the box.

13. The combination according to claim 11, wherein at least one of said grip finger assemblies includes label-affixing pads for a body label, a shoulder label, and a neck label, respectively, bottle-orienting means included in one of said grip finger assemblies, the bottle-orienting means comprising parts cooperable with the spotting projection to turn the bottle into accurately oriented position as the grip finger assemblies approach the article path, and means operative to delay application of a label to the bottle until the orienting means has completed its function.

14. The combination according to claim 11, wherein one at least of the grip finger assemblies comprises a body label-affixing pad and a shoulder label-affixing pad, one of the assemblies including bottle-orienting means and the other of the assemblies including bottle-centering means, the orienting means comprising two relatively movable parts, each having a surface shaped for contact with the spotting projection, and the centering means comprising two relatively movable parts each having a surface shaped to conform approximately to the peripheral surface of the bottle, the surfaces of the two bottle-orienting parts, respectively and the surfaces of the two orienting parts, respectively which are designed to contact the spotting projection, being always spaced equidistantly from a vertical plane perpendicular to the article path and which passes through the center of the carrier for the body label.

15. In a labeling machine of the kind in which bottles of substantially circular transverse section, and each of which is provided with a spotting element, are moved, while standing upright, along a predetermined path through a labeling zone wherein a label is applied to the bottle, without interrupting the advance of the latter, by a label-affixing pad which moves in a path perpendicular to the path of the bottle in bringing a label into contact with the bottle, and then moves along the article path at the same linear velocity as the article while holding the label in contact with the bottle, a support which moves toward the article path and along the article path concomitantly with such motion of the affixing pad, and means carried by said support, operable by contact with the spotting projection on the bottle, accurately to orient the bottle for the reception of a label immediately before the affixing pad brings the label into contact with the article and to hold the bottle in oriented position so long as the affixing pad remains in contact with the label.

16. In combination, in a labeling machine, mechanism for correcting the orientation of articles each having a spotting projection, and which enter the field of action of a label-applying pad, one after another, after having been spotted so that the projection occupies approximately the correct position of orientation, and wherein the articles advance without interruption through the field of action of the label-affixing pad, the correcting mechanism being located at the opposite side of said path from the label-affixing pad and being operative to restore the article to correct position of orientation if the article has turned, after its initial orientation and before it reaches the field of action of the label-affixing pad, said correcting mechanism comprising a pair of spaced projection-engaging parts, a support on which said parts are mounted and which, at times, moves along the article path at the same linear velocity as the article, means operative to contact said parts with the article at opposite sides, respectively, of the spotting projection, and means operative to move said parts toward each other so as to grip the spotting projection between them, said parts being so constructed and arranged as accurately to hold the spotting projection in a plane perpendicular to the article path while the label is being affixed to the article.

17. The combination according to claim 16, further characterized in having means, located at the opposite side of said path from said orienting means, operative accurately to position the axis of the bottle in the vertical plane in which the center of area of the affixing pad moves in approaching the article path.

18. Apparatus according to claim 17, wherein the means for positioning the axis of the bottle comprises a support which moves toward and from the article path concomitantly with the affixing pad, and relatively movable levers mounted on said support to turn about parallel axes which are equidistant from the plane in which the center of area of the affixing pad moves in approaching the article path, the levers having concavely curved edges engageable with the periphery of the bottle.

19. In combination in a labeling machine wherein bottles to be labeled are moved by a conveyor along a predetermined path and wherein a label-affixing pad moves from a transfer position, where it receives a label, to an affixing position where it contacts the label with a bottle, means for so moving said pad that in approaching the article path, its center of area moves in a vertical plane perpendicular to the article path, a support which moves concomitantly with the pad as the latter approaches said path, and means carried by said support operative to position the axis of the bottle in said plane just before the label is contacted with the bottle.

20. The combination according to claim 19, wherein the means for positioning the axis of the bottle comprises a pair of levers mounted upon said support to turn about parallel axes which are spaced apart equidistantly from the vertical plane of motion of the center of area of the pad, each lever having a concavely curved edge of a radius approximating that of the peripheral surface of the bottle, and spring means connected to the respective levers and which tends to turn them in opposite directions thereby to place their concave edges in embracing relation to the surface of the bottle.

21. In combination in a labeling machine in which a conveyor moves bottles, of approximately circular transverse section and each having a spotting projection, uninterruptedly along a predetermined path and having a label-affixing pad which moves from a position at which it receives a label to an applying position where it contacts the label with a moving bottle, means cooperable with the spotting projection to turn the bottle to an accurately oriented position for the reception of the label, a rock shaft at each side respectively of the article path and parallel thereto, means for moving the rock shafts concomitantly and in opposite directions, a support pivotally mounted on each rock shaft to turn about an axis parallel to said path, one of said supports carrying the affixing pad and the other support carrying the orienting means, spring means urging each support respectively to move toward the article path, the supports being so constructed and arranged that, as they approach the article path, the orienting means engages the spotting projection on the bottle and completes the orientation of the bottle just before the pad applies the label to the bottle.

22. In a labeling machine of the kind wherein bottles to be labeled are moved uninterruptedly along a predetermined path through the field of action of label-applying means while standing upright, and wherein the label-applying means comprises a label-affixing element whose center of area moves in a plane perpendicular to the article path in transferring a label from the picker to the article and which also moves along the article path for a predetermined distance while holding the label in contact with the article, mechanisms for correcting the orientation of a bottle having a distinctive area for receiving a label, and a spotting projection located in definite relation to said area, the bottle having been subjected to a preliminary spotting operation, prior to the entry of the bottle into the field of action of the label-applying means, said correcting means being operative to restore the bottle to an accurately spotted position, if it is not accurately oriented when it enters said field, and comprising two relatively movable jaws located respectively at opposite sides of and at equal distances from the plane of movement of the label-affixing element as the latter approaches the bottle for affixing the label thereto, and means for moving said jaws to receive the spotting projection between them and to apply force to said projection for turning the bottle.

23. A labeling machine of the kind wherein a conveyor moves articles to be labeled uninterruptedly along a predetermined path through the field of action of label-applying means, and which includes a picker arranged at one side of the article path and which carries a label from the magazine to a transfer station, and wherein a suction grip finger, located at the same side of the article path as the picker, takes the label from the picker at the transfer station and, in moving transversely to the article path, brings the label into contact with the article and then moves along the article path for a predetermined distance at the same linear velocity as the article while holding the label in contact with the article, means operative to correct the orientation of an article having a spotting projection and which enters the field of action of the label-applying means with the center of its spotting projection in a plane which is not exactly perpendicular to the article path, said means for correcting the orientation of the bottle comprising a support which is located at the opposite side of the article path from the grip finger and which moves toward the article path, transversely thereof and also moves along the article path at the same linear velocity as the article, and means carried by the support operative to apply force to the spotting projection so as to turn the bottle until the spotting projection is accurately located in a plane perpendicular to the article path.

References Cited in the file of this patent
UNITED STATES PATENTS

| | | |
|---|---|---|
| 2,602,561 | Carter | July 8, 1952 |
| 2,665,025 | Carter | Jan. 5, 1954 |